(12) United States Patent
Elliott et al.

(10) Patent No.: US 11,683,200 B2
(45) Date of Patent: Jun. 20, 2023

(54) TUNING TOPOLOGY FOR DISTRIBUTION MESH

(71) Applicant: Apple Inc., Cupertino, CA (US)

(72) Inventors: Brent Elliott, Hillsboro, OR (US); Michael Glik, Kfar Saba (IL)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/054,330

(22) PCT Filed: Jun. 27, 2018

(86) PCT No.: PCT/US2018/039819
§ 371 (c)(1),
(2) Date: Nov. 10, 2020

(87) PCT Pub. No.: WO2020/005237
PCT Pub. Date: Jan. 2, 2020

(65) Prior Publication Data
US 2021/0091974 A1    Mar. 25, 2021

(51) Int. Cl.
*H04L 12/46* (2006.01)
*H04L 12/66* (2006.01)
(Continued)

(52) U.S. Cl.
CPC ............ *H04L 12/462* (2013.01); *H04L 12/12* (2013.01); *H04L 12/66* (2013.01); *H04L 41/12* (2013.01);
(Continued)

(58) Field of Classification Search
CPC ....... H04L 12/462; H04L 12/12; H04L 67/10; H04L 41/12; H04L 67/12; H04L 43/18; H04L 12/66; H04W 84/18; Y02D 30/50
See application file for complete search history.

(56) References Cited

U.S. PATENT DOCUMENTS 7,986,657 B2    7/2011  Dobrowski et al.
2006/0248208 A1   11/2006  Walbeck et al.
(Continued)

FOREIGN PATENT DOCUMENTS

CN    1956457 A    5/2007
CN    101243662 A   8/2008
(Continued)

OTHER PUBLICATIONS

Aron et al., "A Topology Control Algorithm for Effective Power Efficiency and Throughput for Wireless Mesh Networks", 2008 Third International Conference on Broadband Communications, Information Technology & Biomedical Applications, Nov. 23-26, 2008, IEEE Xplore: Dec. 8, 2008, p. 89-96. (Year: 2008).*

(Continued)

*Primary Examiner* — Gil H. Lee
*Assistant Examiner* — Chhian (Amy) Ling
(74) *Attorney, Agent, or Firm* — Kowert, Hood, Munyon, Rankin & Goetzel, P.C.

(57) ABSTRACT

A method can include receiving, from communicatively coupled mesh nodes of the mesh distribution network, data indicating whether respective mesh nodes of the mesh nodes are acting as gateways and an amount of traffic being served by the mesh nodes, determining, based on the received data, a first mesh node of the mesh nodes to put into an inactive state, and providing a communication to the first mesh node that causes the first mesh node to enter the inactive state.

20 Claims, 11 Drawing Sheets

(51) Int. Cl.
*H04L 41/12* (2022.01)
*H04L 43/18* (2022.01)
*H04L 67/10* (2022.01)
*H04L 67/12* (2022.01)
*H04L 12/12* (2006.01)
*H04W 84/18* (2009.01)

(52) U.S. Cl.
CPC .............. *H04L 43/18* (2013.01); *H04L 67/10* (2013.01); *H04L 67/12* (2013.01); *H04W 84/18* (2013.01); *Y02D 30/50* (2020.08)

(56) References Cited

U.S. PATENT DOCUMENTS

| | | | |
|---|---|---|---|
| 2007/0161352 A1 | 7/2007 | Dobrowski et al. | |
| 2008/0080475 A1 | 4/2008 | Orth et al. | |
| 2009/0274082 A1 | 11/2009 | Wentink | |
| 2011/0022871 A1* | 1/2011 | Bouvier | G06F 1/3206 713/340 |
| 2011/0026500 A1* | 2/2011 | Shaffer | H04W 40/246 370/338 |
| 2011/0188419 A1 | 8/2011 | Filoso et al. | |
| 2012/0252458 A1 | 10/2012 | Ohnishi | |
| 2012/0281526 A1* | 11/2012 | Singamsetty | H04L 45/28 370/225 |
| 2013/0016612 A1 | 1/2013 | Vasseur et al. | |
| 2013/0078945 A1 | 3/2013 | Lavi et al. | |
| 2015/0264737 A1* | 9/2015 | Chow | H04W 76/15 370/329 |
| 2017/0250856 A1* | 8/2017 | Jetcheva | H04L 41/0668 |
| 2018/0054827 A1* | 2/2018 | Chen | H04W 72/085 |
| 2018/0123950 A1* | 5/2018 | Garg | H04L 63/0236 |
| 2018/0234302 A1* | 8/2018 | James | H04L 41/145 |
| 2019/0182155 A1* | 6/2019 | Chang | H04L 61/251 |

FOREIGN PATENT DOCUMENTS

| | | |
|---|---|---|
| CN | 103024935 A | 4/2013 |
| CN | 106454899 A | 2/2017 |
| CN | 106506409 A | 3/2017 |
| EP | 1278390 A1 | 1/2003 |

OTHER PUBLICATIONS

Extended European Search Report for Patent Application No. EP 18924972; dated Mar. 10, 2021; 7 Pages.
International Search Report and Written Opinion for International Application No. PCT/US2018/039819, dated Mar. 20, 2019, 9 pgs.
Chinese Office Action; Application No. 201880092221.2; dated Nov. 25, 2021; 10 pgs.
Notice to Grant a Patent Invention with Search Report corresponding to CN application No. 201880092221.2 dated Oct. 10, 2022; 3 pgs.

\* cited by examiner

700

702 — PROVIDE, BY A CONTROLLER OF AN ANTENNA, A SIGNAL TO A SUBARRAY OF THE ANTENNA ARRAY THAT CAUSES THE SUBARRAY TO BE PLACED IN AN INACTIVE STATE IN RESPONSE TO A TIMER VALUE OF A TIMER CORRESPONDING TO A FIRST PORTION OF A COMMUNICATION FRAME WITH A LINK BUDGET REQUIREMENT LESS THAN A SPECIFIED THRESHOLD

704 — PROVIDE ANOTHER SIGNAL TO THE SUBARRAY OF THE ARRAY THAT CAUSES THE SUBARRAY TO BE PLACED IN AN ACTIVE STATE IN RESPONSE TO THE TIMER VALUE CORRESPONDING TO A SECOND PORTION OF THE COMMUNICATION FRAME WITH A LINK BUDGET REQUIREMENT GREATER THAN A SPECIFIED THRESHOLD.

FIG. 7

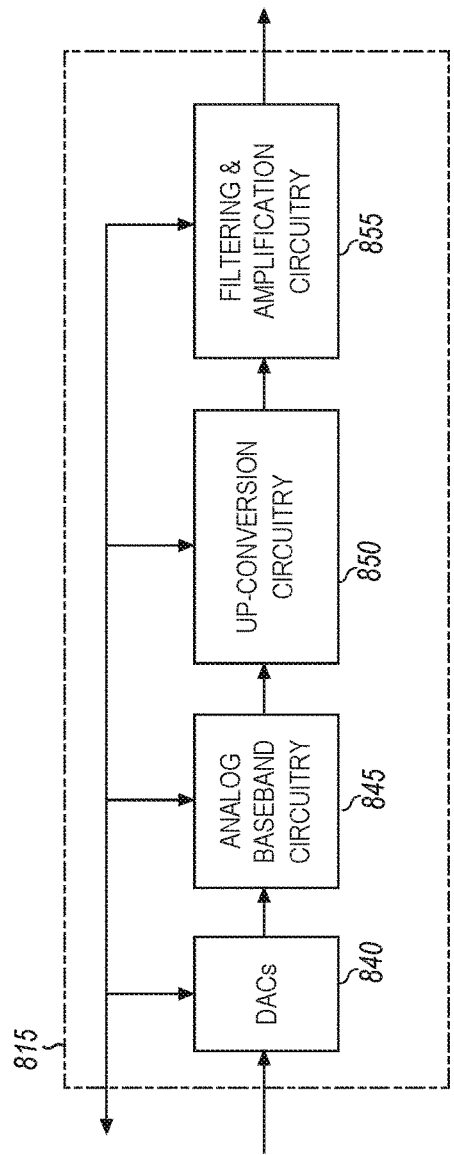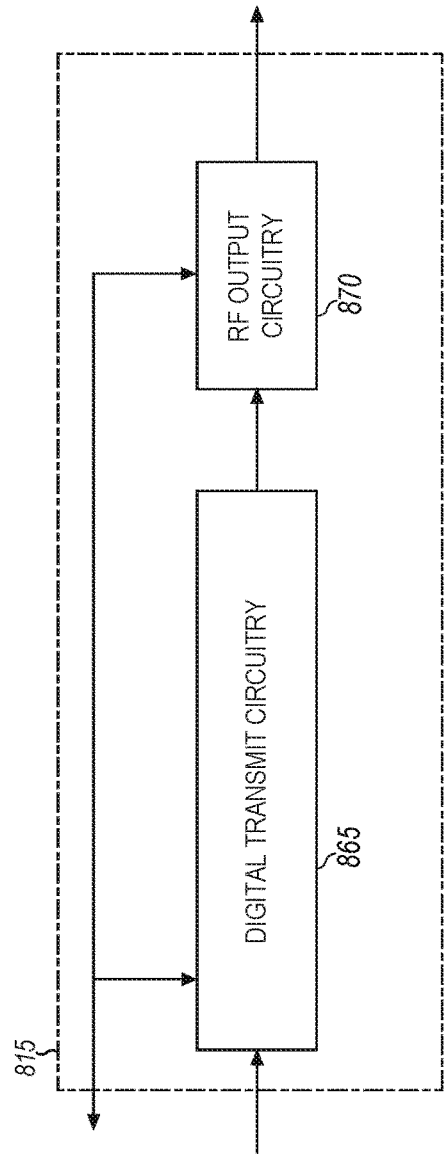

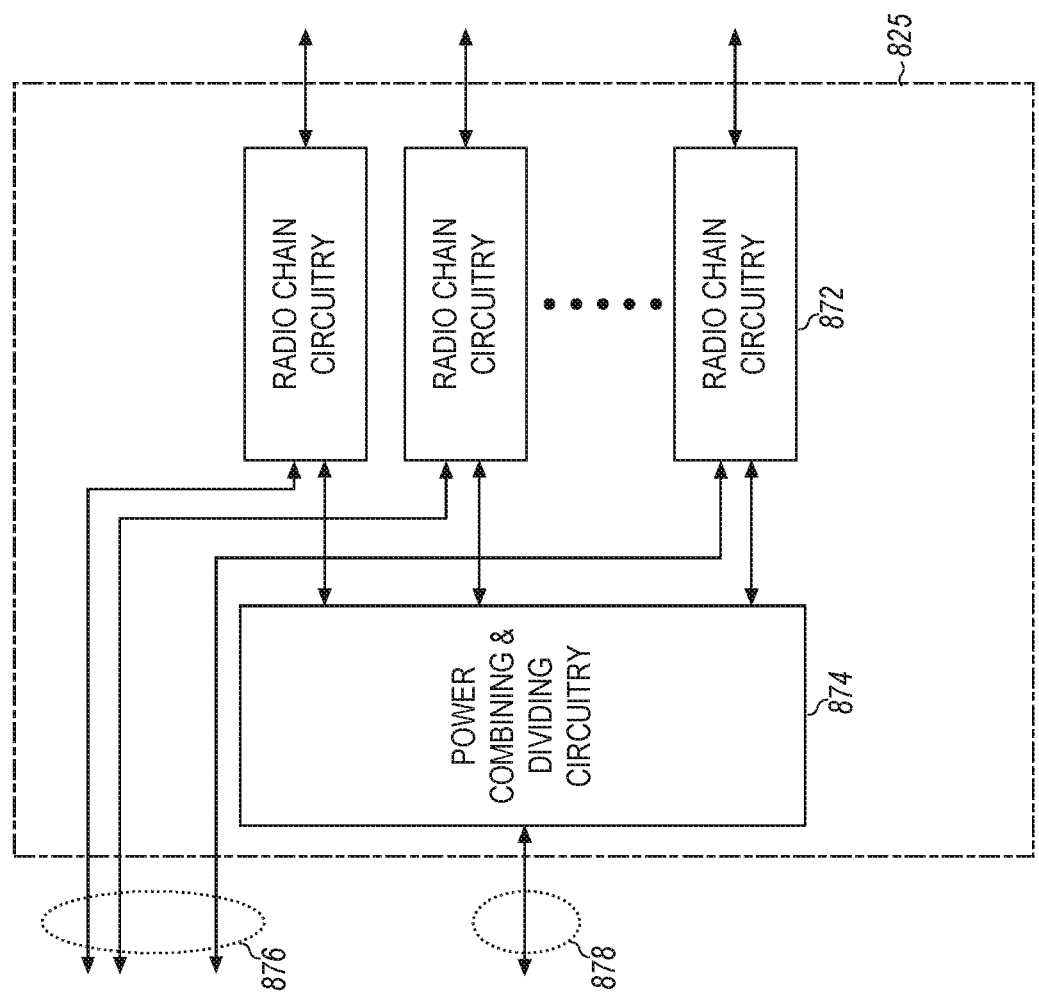

TUNING TOPOLOGY FOR DISTRIBUTION MESH

This application is a U.S. National Stage filing of International Application No. PCT/US2018/039819, filed Jun. 27, 2018, titled "Tuning Topology for Distribution Mesh", which is incorporated herein by reference in its entirety.

TECHNICAL FIELD

Embodiments described herein pertain in general to adjusting a topology of a distribution mesh. In some embodiments, the adjustment may include putting a mesh node of the distribution mesh into a lower power state, such as to reduce power consumption of the distribution mesh.

BACKGROUND

A distribution mesh includes a series of nodes interconnected in a multi-hop configuration to enable packet forwarding from one or more points of ingress (a first gateway) to one or more points of egress (a second gateway). An example of a point of ingress may be a wired or wireless access node, such as an access point (AP). A user may send a packet from a device through the access node. The access node may be a part of the distribution mesh or otherwise be in communication with one or more mesh nodes of the distribution mesh.

The packet may include a destination that is a point of egress or reachable through the point of egress from the mesh. The point of egress can include a node with a fiber backhaul that offers a path to the Internet. Many factors impact optimal routing or relaying of the packet among the nodes in the mesh from the point of ingress to egress. During typical operation, the routing or relay path may be chosen to maximize overall system capacity or maximal site interconnectivity. However, during sustained periods of low-utilization, continuing to use such a routing hierarchy will, in many cases, result in an unnecessary number of nodes being powered on and connected to the mesh. Thus, such routing schemes unnecessarily consume power.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which:

FIG. 7 illustrates, by way of example, a diagram of an embodiment of a method for reducing power usage of a phased antenna array.

FIGS. 8A, 8B, 8C, 8D, and 8E illustrate, by way of example, respective block diagrams of portions of a phased antenna array system.

DETAILED DESCRIPTION

Figure 1:
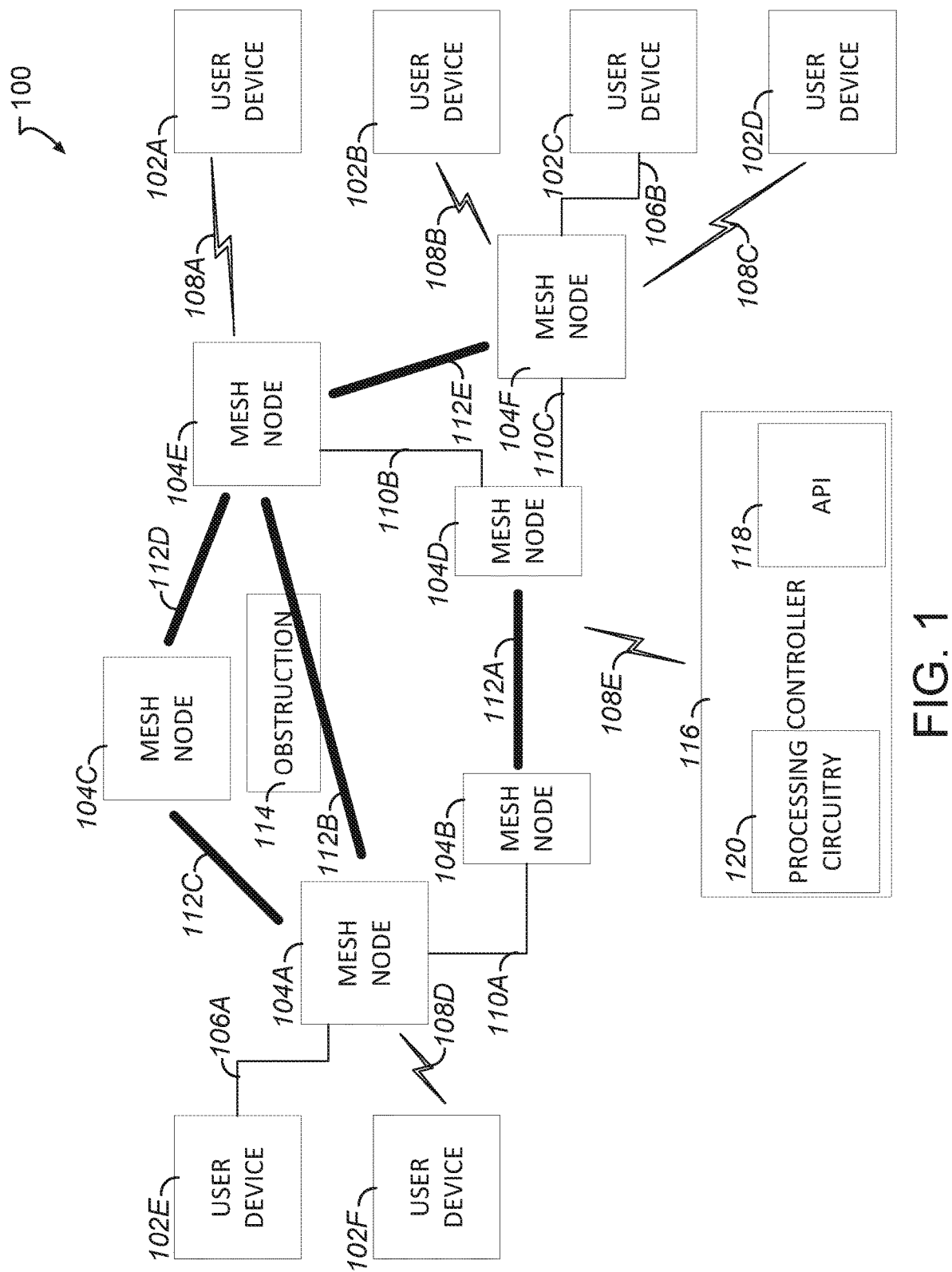
FIG. 1 illustrates, by way of example, a diagram of an embodiment of a network that includes a distribution mesh.

In the following description, for purposes of explanation, numerous specific details are set forth in order to provide a thorough understanding of some example embodiments. It will be evident, however, to one skilled in the art, that the present disclosure may be practiced without these specific details.

Embodiments of this disclosure regard a variety of devices, systems, and methods for tuning a wireless mesh topology or a node of the wireless topology to reduce power consumption. The routing hierarchy of a distribution mesh may be updated to reduce the number of nodes (e.g., during periods of low utilization) that are powered on. Reducing the number of nodes powered on can influence where power is consumed and reduce the total power consumption of the distribution mesh. Embodiments can include a mechanism that allows nodes within the mesh to be placed in a low-energy state, while maintaining sufficient connectivity through the distribution mesh.

The power consumption and the corresponding thermal buildup of high-throughput wireless nodes using phased array antennas may be significant. This may result in increased cost of operation and increased cost of the device due to requirements for improved thermal dissipation of the equipment. In some embodiments, a reduction in power consumption can be achieved by reducing a number of active segments in an antenna array.

There have been limited commercial applications of distribution meshes to date. The current distribution meshes focus on design objectives which maximize system capacity and interconnectedness of all mesh nodes in the system. These current solutions do not consider reducing power by modifying the routing hierarchy within the mesh to reduce power consumption.

In some embodiments in which one or more distribution mesh nodes which have not participated as ingress or egress nodes for the mesh (meaning that their role does not include interfacing with user devices) may indicate to a mesh controller (which may be centralized or decentralized) the availability to enter a low power state. In other embodiments, the mesh controller may determine this availability for a low-power state by monitoring the ingress, egress, and traffic routing operations of the nodes within the distribution mesh. The indication of a nodes candidacy for low-power node may additionally include information including but not limited to a historical power consumption of the device, an availability of power at the mesh node, the reliability of power at the mesh node, the capacity and charge of power storage available to the mesh node, the cost of power for operating the mesh node, a name of an entity that provides power to the mesh node, or a name of an entity paying for power consumed by the mesh node.

Some embodiments may reduce a number of transmitting and receiving elements of an antenna array during stages of a frame transmission/reception, such as to reduce power consumption and thermal build-up. Embodiments may dynamically reduce a full phased antenna array to a subarray during a portion of the frame which may have reduced link budget requirements. Such embodiments can achieve a power/thermal buildup reduction without substantial impact to the capacity of the phased antenna array.

Reference will now be made to the FIGS. to describe further details of embodiments. In the FIGS. different subscripts indicate different instances of the same object. For example, user device 102A and user device 102B are different instances of a user device 102.

FIG. 1 illustrates, by way of example, a diagram of an embodiment of a network 100 that includes a distribution mesh. The network 100 as illustrated includes user devices 102A, 102B, 102C, 102D, 102E, and 102F, mesh nodes 104A, 104B, 104C, 104D, 104E, and 104F, and a controller 116. The distribution mesh includes mesh nodes 104A, 104B, 104C, 104D, 104E, and 104F and interconnections therebetween. Mesh nodes 104A, 104E, and 104F that interface with a user device 102A, 102B, 102C, 102D, 102E, and 102F may be referred to as a "gateway" herein.

The user devices 102A-102F can include devices capable of interfacing with a gateway, such as to connect to the Internet. The user devices 102A-102F can include a phone, such as a smartphone, a tablet, a desktop computer, a laptop computer, an internet of thing (IoT) device, smart television, vehicle (e.g., truck, car, aerial vehicle, water-borne vehicle, or the like), or the like. The user devices 102A-102F can provide content to, or receive content from, another user device 102A-102F or a database, application server, or the like. The user device 102A-102F provides a packet either requesting data from or providing data to the distribution mesh.

The user devices 102A-102F may use a wired communication channel 106A, 106B or wireless communication channel 108A, 108B, 108C, or 108D to communicate with the gateway. The wired communication channel 106A-106B can include an Ethernet connection. Ethernet connections generally comply with the standard Institute of Electronic and Electrical Engineers (IEEE) 802.3 or a variation thereof or International Organization of Standards (ISO) 8802-3 or a variation thereof. The wireless communication channel 108A-108D can include Wireless Fidelity (Wi-Fi) that complies with standard IEEE 802.11 or variations thereof, cellular (long term evolution (LTE)), Bluetooth, ZigBee, light fidelity (Li-Fi) that uses modulations in light (e.g., from a light emitting diode (LED)) intensity to transmit data, or the like.

The traffic from the user devices 102A-102E can include foreground traffic and background traffic. Foreground traffic is visible to the user, such as a website request, a phone call, text message, or the like. Background traffic is application-initiated traffic, such as automatically uploading or downloading data, or the like. Examples of background traffic include control channel communications, uploading data to the cloud, or the like.

The gateway (e.g., mesh node 104A, 104E, or 104F) can receive packets or other user traffic from one network and provide the packets to another, different network. The gateway can receive the packet and determine a next mesh node 104A-104F to receive the packet. In some embodiments, the gateway may determine a complete path for the packet to get the packet to the destination. Conventionally, however, the mesh nodes 104A-104F are configured to choose a next mesh node that will maximize throughput of the packet to its destination. The mesh nodes 104B, 104C, and 104D that are not gateways form a distribution mesh, with the gateways acting as the ingress and egress points for the distribution mesh.

The distribution mesh typically communicates data at a faster rate than the gateway communicates data to the user device 102A-102F. For example, the distribution mesh can communicate data at a rate that is over ten Gigahertz (GHz), such as up to 60 GHz or even more, while the gateway can be constrained to five GHz or less. This is due, at least in part, to the impracticality of including optical or large phased array antennas (the technology to communicate at the greater data rates) into user devices 102A-102F. This technology generally consumes too much space, power, and costs too much to be included in the user devices 102A-102F and is reserved for the distribution mesh.

The distribution mesh can communicate data using a wired communication channel 110A, 110B, 110C, or a wireless communication channel 112A, 112B, 112C, 112D, or 112E. The wired communication channel 110A-110C can include an Ethernet connection (as previously discussed), an optical fiber connection, or the like.

The controller 116 manages routing of data in the mesh distribution network. The controller 116 can be centralized or distributed. A centralized controller provides routing instructions to each mesh node. A distributed controller includes a plurality of synchronized controllers that, through their combined efforts, provide routing instructions to each mesh node. The controller 116 can manage the routing of packets or other traffic through the mesh distribution network. The controller 116 may manage the routing to reduce power consumption, such as while maintaining quality of service (QoS), Service Level Agreement (SLA), bandwidth, throughput requirements, or the like.

The controller 116 may provide data to a mesh node 104A-104F indicating that the mesh node 104A-104F is to enter a low power state. Alternatively, the controller 116 may receive a communication from the mesh node 104A-104F indicating that the mesh node 104A-104F may be placed in a low power state. The controller 116 may determine which mesh node 104A-104F (if any) to place or allow to enter a low power state based on one or more of: (1) whether the node is a gateway; (2) an amount of power consumed by the node (e.g., historical power consumption of the device, an availability of power at the mesh node, the reliability of power at the mesh node, the capacity and charge of power storage available to the mesh node, the cost of power for operating the mesh node, a name of an entity that provides power to the mesh node, or a name of an entity paying for power consumed by the mesh node, or the like); (3) whether there are alternative options for routing the traffic through the mesh distribution network that satisfy QoS or SLA; or the like.

Placing the mesh node 104A-104F into a low-power state may have one or more of several implications. First, it reduces the power for the mesh node 104A-104F and overall power consumption of the mesh distribution network. Second, it may result in the mesh node 104A-104F having increased latency when traffic ingresses to the mesh node 104A-104F to re-establish connectivity. Third, it can force a mesh node 104A-104F relaying traffic through this link to use an alternate and, in some cases, less optimal routes (e.g., beams) to establish connectivity (including selecting links with increased range, additional reflections, and other factors that may degrade the capacity of the link). During periods of low-utilization, these consequences can be assessed and determined to be acceptable by the logical mesh controller 116 relative to the power, environmental, and economic advantages achieved. This is particularly true for higher frequency systems which often carry a more significant baseline power consumption even in largely idle operation.

Based on availability indicators or additional information listed above, the controller 116 can run a variation of a minimum spanning tree technique, or the like to determine a mesh distribution network topology that includes only a subset of all the nodes of the mesh distribution network. A minimum spanning tree (MST) or minimum weight spanning tree is a subset of the edges of a connected, edge-weighted (un)directed graph that connects all the vertices together. An MST can include a spanning tree whose sum of edge weights is as small as possible. The controller 116 can maintain a graph with the mesh nodes 104A-104F as vertices in the graph and communication connections between the mesh nodes 104A-104F as edges.

Figure 2:
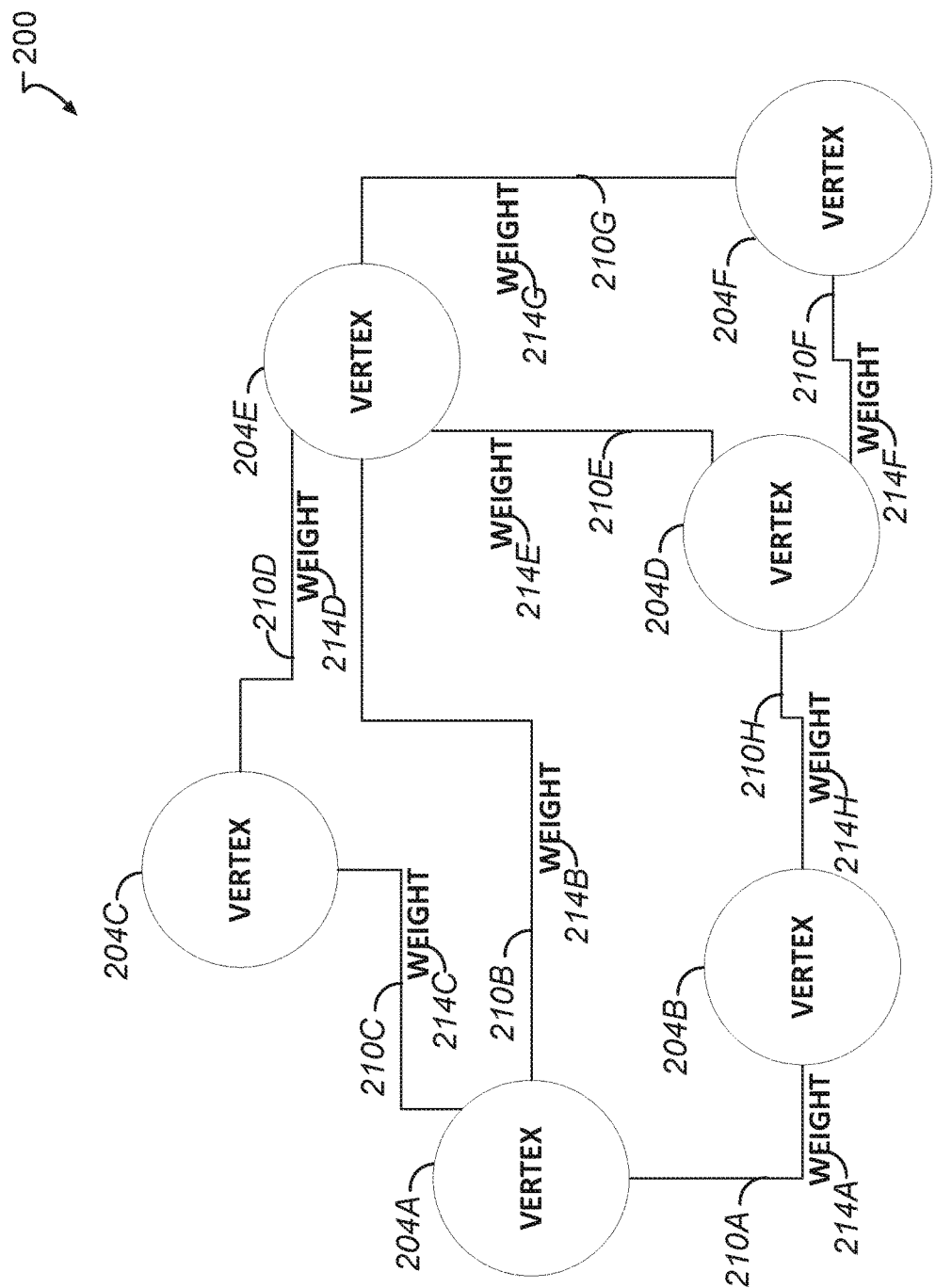
FIG. 2 illustrates, by way of example, a diagram of an embodiment of a complete graph of the mesh distribution network of the system of FIG. 1.

FIG. 2 illustrates, by way of example, a diagram of an embodiment of a complete graph 200 of the mesh distribution network of the system 100 of FIG. 1. The graph 200 as illustrated includes vertices 204A, 2049, 204C, 204D, 204E, and 204F that each correspond to a mesh node 104A-104F, respectively. Each edge 210A, 210B, 210C, 210D, 210E, 210F, 210G, and 210H corresponds to a possible communication path between vertices 204A-204F. Each of the edges 210A-210H can include a respective weight 214A, 214B, 214C, 214D, 214E, 214F, 214G, and 214H.

The weight 214A-214H can indicate a corresponding gain for placing a mesh node in a low power state (e.g., a bandwidth (e.g., data rate), reliability (e.g., up time to down time ratio or the like), signal strength, signal to noise ratio (SNR), QoS, power consumption, a combination thereof, or the like of the communication path). The weight 214A-214H can be determined based on the bandwidth, reliability, signal strength, SNR, QoS, power consumption, a combination thereof or the like. A higher weight 214A-214H can indicate that the corresponding communication connection to the mesh node 104A-104F is a worse candidate for temporary removal from the mesh distribution network than a relatively higher weight, or vice versa. For example, if a higher power node provides a same reliability, bandwidth, signal strength, or the like, as another path through the distribution mesh, the weight of the node can be lower than a lower power node that provides about the same or even lower reliability, bandwidth, signal strength, or the like.

Based on the corresponding trees created, the controller 116 can exclude one or more nodes (e.g., up to a specified max number of nodes) from the mesh distribution network. If a topology that satisfies QoS, signal strength, or other constraints can be formed and it satisfies accommodated performance requirements, candidate mesh distribution nodes can be powered down in response to a communication from the controller 116. In response to the mesh distribution network being unable to satisfy the user device traffic (due to increased traffic or changes in physical conditions of specific nodes/links, for example) the controller 116 can provide a message to a node indicating the node is to power up, such as to eventually restoring a topology that maximizes capacity. Optimizations might apply, such as by powering up only mesh nodes in sectors required to handle the additional traffic, such as to continue to minimize overall network power consumptions, while maintaining sufficient bandwidth, QoS, signal strength, or the like.

Consider the mesh distribution network in FIG. 1. The controller 116 can determine that the mesh node 104C is not currently acting as a gateway (ingressing or egressing traffic from the mesh) and that traffic in the mesh distribution network is sufficiently low. The controller 116 can further determine that one or more of QoS, signal strength, bandwidth, or SLA will still be satisfied if the mesh node 104C is placed in a low power state. The controller 116 can provide a communication to the mesh node 104C that causes the mesh node 104C to enter a low power state. The controller 116 can further provide data to the mesh nodes 104A and 104E coupled to the mesh node 104C indicating that the mesh node 104C will be entering a low power state. The mesh nodes 104A and 104E can alter their traffic to avoid the mesh node 104C. In one or more embodiments, the mesh nodes 104A and 104E can determine how to route traffic to avoid the mesh node 104C or the controller 116 can provide data indicating how to alter the traffic routing to avoid the mesh node 104C. In the example of FIG. 1, the mesh nodes 104A and 104E can communicate traffic directly to one another. This configuration may not be ideal, as there may be an obstruction 114 that impedes or otherwise degrades a communication between the mesh nodes 104A and 104E.

In one or more embodiments, a mesh node 104A-104F that is not currently active (ingressing or egressing traffic from the mesh distribution network) can be omitted from the network, such as during a period of low-utilization. In some cases, the performance of the link in this "power-optimized topology" example will offer lower capacity as a trade-off for improved system-level power consumption of the mesh distribution network.

An additional benefit of embodiments can include thermal management of mesh nodes 104A-104F, such as under higher temperature operating conditions. In some instances, a cooling capacity of one or more of the mesh nodes 104A-104F may be insufficient. In these conditions, an approach that is similar to the previously discussed power savings embodiments can be used to allow one or more mesh nodes 104A-104F to enter a low-power state, even at the expense of overall system capacity. Such an embodiment may enable a reduced duty cycle of operation for one or more mesh nodes 104A-104F. This reduced duty cycle will result in an effective reduction in the operating temperature. The reduction in operating temperature can improve link efficiency and reliability and even the lifespan of the equipment. Here, the power savings achieved has the corresponding benefit of reduced thermal generation. In some implementations, this approach will be used to switch between different routing topologies more frequently to reduce the duty cycle of a potentially large number of nodes. In some implementations, these nodes will report factors such as their operating temperature to the logical mesh controller 116 to facilitate the selection of the optimal duty cycle per node. As an example, nodes 104A-104F exposed to sunlight or other heat source may be operating at a higher than optimal temperature and may be selected to operate at a lower duty cycle than other nodes 104A-104F.

Determination, by the controller 116, that a node 104A-104F can be placed in an inactive state can be based on one or more of whether traffic is ingressing or egressing from the node, whether traffic on the node includes foreground or background traffic, monitoring control messages to gateways connected to the node, or whether an event is scheduled at a location or venue that is covered by the mesh node 104A-104F in question. The control messages may include information regarding active traffic sessions, whether a node is ingressing or egressing traffic to or from the mesh, what devices are connected to each other, optimal configurations between nodes, or the like. The control messages may include legacy messages or new messages. The foreground traffic or background traffic may be separated from each other and the foreground traffic or background traffic can be routed around a node placed in a lower power state.

The decision as to whether to place the node 104A-104F in an inactive state can be performed by the controller 116, such as an application programming interface (API) 118 or other processing circuitry 120 of the controller 116. The API 118 may include a set of subroutine definitions, protocols, or other tools for building a software application. The API 118 generally manages communication between software or hardware that uses distinct communication protocols.

The processing circuitry 120 can perform similar operations to the API 118, but in hardware. The processing circuitry 120 can be used independent of or along with the API 118 to determine whether a node 104A-104F is to be placed in an inactive state. The processing circuitry 120 can include one or more transistors, resistors, capacitors, inductors, diodes, switches, regulators, power supplies, transformers, logic gates (e.g., AND, OR, XOR, negate, or the like), multiplexers, oscillators, rectifiers, sensors, integrated circuits, amplifiers, mixers, antennas, or the like.

The processing circuitry 120 or the API 118, alone or in combination, can monitor a state of the nodes 104A-104F and issue a communication that causes the node 104A-104F to enter an inactive state, re-route traffic in response to another node entering the inactive state, re-enter an active state, or the like. For example, in response to determining that a node 104A-104F is only communicating background traffic and is not performing ingress or egress operations, the processing circuitry 120 or API 118 can issue a command that causes the node 104A-104F to enter the inactive state. In another example, in response to determining the node 104A-104F is to be placed in an inactive state, the processing circuitry 120 or the API 118 can issue a communication to one or more nodes 104A-104F that communicate to the inactive node that indicates that the node 104A-104F is going into the inactive state.

Figure 3:
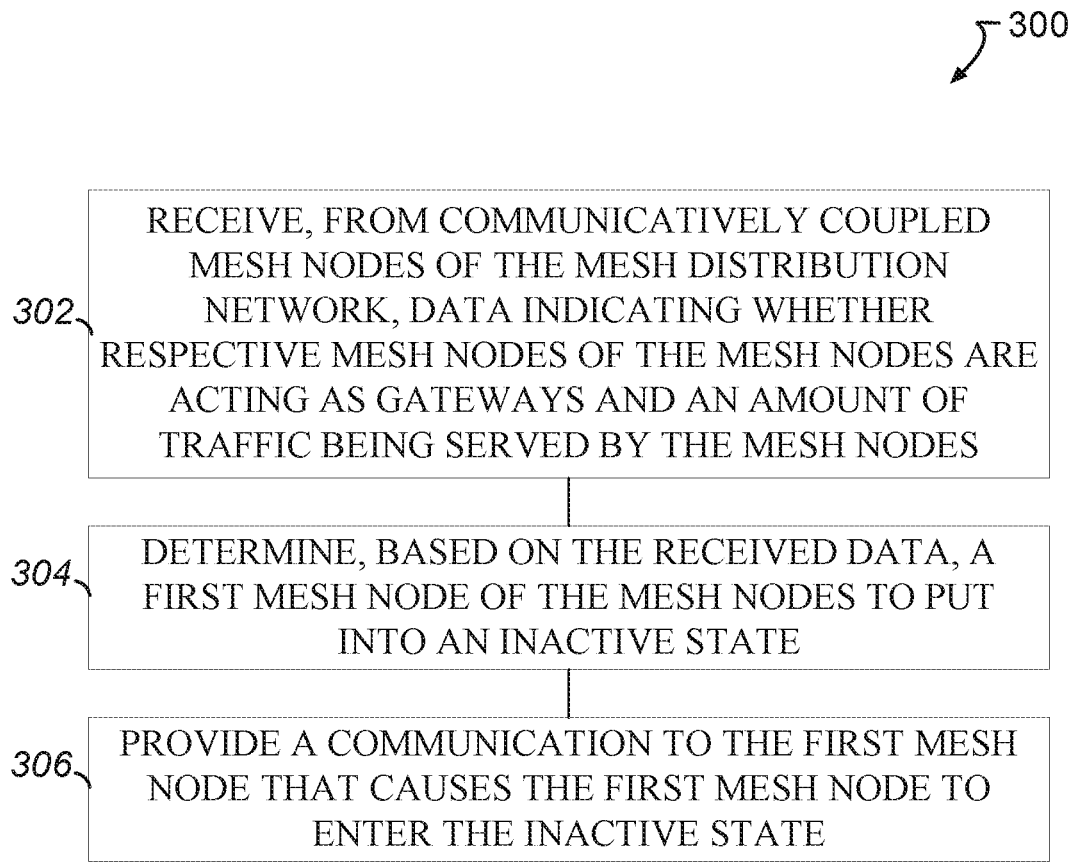
FIG. 3 illustrates, by way of example, a diagram of an embodiment of a method for reducing power consumption of a mesh distribution network.

FIG. 3 illustrates, by way of example, a diagram of an embodiment of a method for reducing power consumption of a mesh distribution network. The method 300 as illustrated includes receiving from communicatively coupled mesh nodes of the mesh distribution network, data indicating whether respective mesh nodes of the mesh nodes are acting as gateways and an amount of traffic being served by the mesh nodes, at operation 302; determining, based on the received data, a first mesh node of the mesh nodes to put into an inactive state, at operation 304; and providing a communication to the first mesh node that causes the first mesh node to enter the inactive state, at operation 306.

The operation 304 can further include determining whether the first mesh node is acting as a gateway and in response to determining the first mesh node is acting as a gateway, refraining from putting the first mesh node into the inactive state. The method 300 can further include providing a communication to a second mesh node of the mesh nodes that is communicatively coupled to the first mesh node, the communication indicating that the first mesh is going into the inactive state. The method 300 can further include comparing the data indicating the amount of traffic being served by the first mesh node to a specified threshold, and determining the first mesh node is to be put into the inactive in response to the amount of traffic being served is less than the specified threshold.

The method 300 can further include receiving further data indicating one or more of historical power consumption of the first mesh node, cost of power for the first mesh node, and a name of an entity responsible for providing power to the first mesh node. The method 300 can further include receiving further data indicating an operating temperature of the mesh nodes. The method 300 can further include determining the first mesh node of the mesh nodes to put into an inactive state based on the operating temperature being greater than a specified threshold.

The method 300 can further include, wherein the amount of traffic being served by the mesh nodes includes an amount of foreground traffic and background traffic and the method further comprises providing a communication to a mesh node serving the background traffic that causes the background traffic to be routed around the mesh node. The method 300 can further include receiving data indicating a schedule of a location serviced by a mesh node of the mesh nodes, and in response to determining the schedule indicates a time period of lower traffic is scheduled, providing the communication Reduced Throughput Antenna Array High-throughput wireless equipment, particularly operating in higher frequency bands (e.g., ten GHz and higher) and leveraging phased array antennas may consume a significant amount of power. To maximize capacity, these systems employ high modulation schemes (e.g., schemes with higher spectral efficiency, such as 64, 128, or 256 quadrature amplitude modulation (QAM) or higher) that demand a significant link budget. Likewise, it is common for these systems to operate at very high duty cycles, particularly during periods where the device expects that it may receive data or when the array may be transmitting data.

Unfortunately, reducing the gain of the transmit or receive operation provides for only a small reduction in operating power as a share of total array power consumption. Embodiments include an approach to dynamically scale back the number of antenna elements or some of the various reasonably high-power consumption elements that are associated with these elements during portions of the operation of the device. Such embodiments reduce the power consumed and thermal buildup generated within the equipment. Embodiments may reduce the duty cycle of specific elements in the system, such as power amplifiers (PAs), switches, phase shifters, and mixers. These elements have a significant impact on total power consumption and thermal buildup.

Embodiments can include using a subset of a full antenna array during periods where the link budget requirements are reduced, including but not limited to, detection of the Short Training Field (STF), Channel Estimation (CE), or Header (HDR) (using the terminology of IEEE 802.11ad as an example). Similar concepts are relevant to other wireless technologies wherein, during a portion of a frame, the antenna array is operated at a modulation with relaxed link budget requirements.

Figure 4:
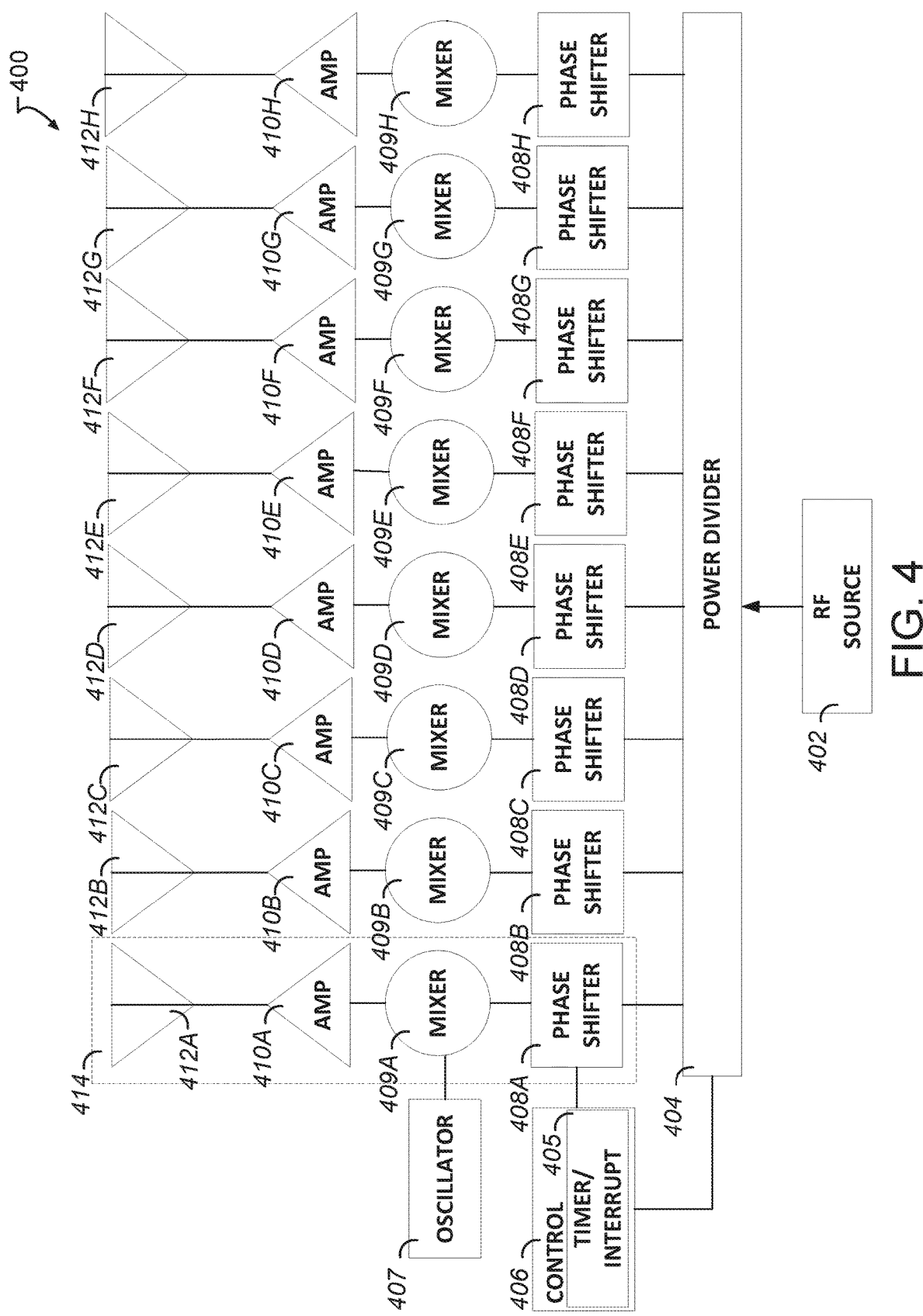
FIG. 4 illustrates, by way of example, a diagram of an embodiment of a phased antenna array in accord with one or more embodiments.

FIG. 4 illustrates, by way of example, a diagram of an embodiment of a phased antenna array 400 in accord with one or more embodiments. The phased antenna array 400 as illustrated includes an RF source 402, a power divider 404, control circuitry 406, phase shifters 408A, 408B, 408C, 408D, 408E, 408F, 408G, and 408H, an oscillator 407, mixers 409A, 409B, 409C, 409D, 409E, 409F, 409G, and 409H, amplifiers 410A, 410B, 410C, 410D, 410E, 410F, 410G, and 410H, and antennas 412A, 412B, 412C, 412D, 412E, 412F, 412G, and 412H. Each of the elements of the antenna array 400 may consume power, unnecessarily. That is, not all components of the antenna array 400 need to be powered on and operating all the time to sufficiently perform the operations desired.

The RF source 402 provides data to be modulated onto a carrier. The RF source 402 can be provided by a device, such as a base station or other device. The power divider 404 splits the signal from the RF source 402 into one or more signals, based on signals from the control circuitry 406. The control circuitry 406 can control how many and which phase shifters 408A-408H, mixers 409A-409H, amplifiers 410A-410H or antennas 412A-412H are powered on, inactive, or powered off. Not all connections between the control circuitry 406 and other components are illustrated, to not obscure the view. The control circuitry 406 may include a timer/interrupt device 405. The timer/interrupt device 405 may indicate that a subarray of the array can be powered down or is to be powered up. In one or more embodiments, the interrupt device 405 includes a pin on which an out-of-band signal can be received indicating that the array is to be powered up, powered down, or otherwise placed in a state that consumes less power. The timer/interrupt device 405 may determine whether a pre-determined amount of time has lapsed or an event (e.g., receipt of a short training field) has occurred and issue a command that causes one or more components of the phased antenna array 400 to be powered up, powered down, or placed in a low power state, etc.

The phase shifters 408A-408H can alter a phase of a signal from the power divider 404 in accord with signals from the control circuitry 406. The phase shifters 408A-408H can adjust a phase of a signal incident thereon so that the signals when transmitted by the antennas 412A-412H form a beam travelling in a specified direction. By adjusting the phase applied to signals at the phase shifter 408A-408H, the control circuitry 406 can adjust a direction of the beam transmitted by the antenna 412A-412H. The control circuitry 406 can include electrical or electronic components similar to the processing circuitry 120.

The oscillator 407 provides a carrier signal on which data from the RF source 402 can be modulated, by the mixer 409A-409H. Connections between the oscillator 407 and the mixer 409B-409H are not illustrated so as to not obscure the view in FIG. 4. The mixer 409A-409H combines signals from respective phase shifters 408A-408H onto the carrier signal form the oscillator 407. The amplifier 410A-410H increases an amplitude of a signal from the mixer 409A-409H, respectively, and provides the amplified signal to a respective antenna 412A-412H. The antennas 412A-412H transduce electrical signals to electrical waves that propagate through space or vice versa.

Antennas 412A-412H that operate at higher frequencies are typically smaller than antennas that operation at lower frequencies. This allows antennas that operate at higher frequencies to have a smaller form factor than antennas that operate at the lower frequencies. The smaller form factor allows for single package RF IC systems that include the phase shifter 408A-408H, the mixer 409A-409H, the amplifier 410A-410H, and the antenna 412A-412H. Such packages can be referred to herein as RF integrated circuits (RFICs) and are indicated by dashed box 413.

Figures 5, 6:
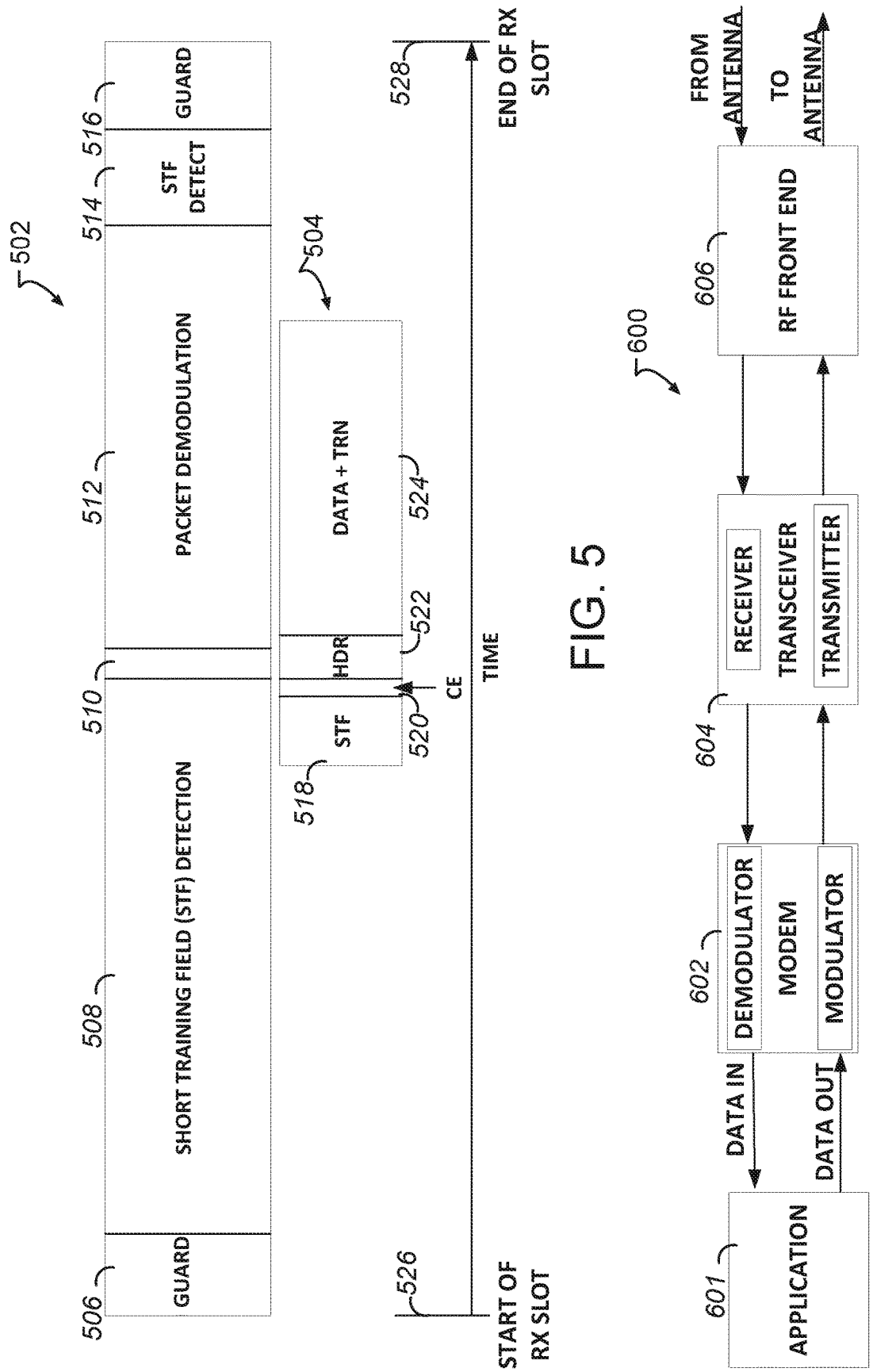
FIG. 5 illustrates, by way of example, a timing diagram of an embodiment of an antenna array state and a corresponding transmitted packet in a receive slot.
FIG. 6 illustrates, by way of example, a diagram of an embodiment of a phased array antenna system.

FIG. 5 illustrates, by way of example, a timing diagram of an embodiment of an antenna array state 502 and a corresponding transmitted packet 504 in a receive slot. The antenna array state 502 at a start of a receive slot 526 may be in a guard state 506. The guard state 506 can correspond to a time buffer of the receive slot that is provided between receive frames, as defined by a standard or protocol. In the guard state 506, the control circuitry 406 can place all the RFIC components of the sub-array in an inactive, idle, or low power state. At or near the end of the guard state 506, the control circuitry 406 can place one or more of the RFIC components in an active power state, such as to place the antenna array in an STF detection state 508. In one or more embodiments, the control circuitry 406 can begin powering on a component a specified period of time before the change of state is to occur. This can allow the component to be fully functional by the time it is needed.

In one or more embodiments, a power up state 510 may be used to power on the entire antenna array. The power up state 510 can be initiated in response to an STF field 518, a channel estimation (CE) field 520, or a portion of a header field 522. In one or more embodiments, a stronger channel link may be used for packet demodulation in the packet demodulation state 512, such as all antennas of the antenna array. After the data and training field 524 is received and processed in the packet demodulation state 512, the control circuitry 406 can revert the antenna array to a lower power state, such as by placing one or more RFICs in an inactive, idle, or other low power state. In one or more embodiments, a singe RFIC can remain active in the STF detection states 508 and 514. In the guard state 516, in one or more embodiments, all RFICs of the antenna array can be inactive, idle, or otherwise in a low power state.

In summary, in a multiple-RFIC phased array antenna system, a single RFIC, a subset of an RFIC, or a subset of RFICs can be used for the receive operation, such as to detect and receive the STF 518 and CE field 520 of an 802.11ad receive slot. All the RFICs can be brought online in time to decode the data payload of the frame (e.g., the header frame 522 or the data and training frame 524) so that the antenna array can operate at a higher modulation with higher link budget requirements.

Some embodiments may use synchronization with other nodes (e.g., other mesh nodes) in the system to identify durations in which guard periods are present to power down relevant portions of the system when detection of frames is not expected. Similarly, during periods of transmission, some embodiments can power some or all the system down when no frames are available to be transmitted. These mechanisms reduce the overall duty cycle of operation of circuits within one or more RFIC and one or more baseband ICs in the system.

In some embodiments, the control circuitry 406 can leverage information about one or more links to remote devices in determining whether to reduce a number of active RFICs. This information can help determine the necessary link budget for proper reception of the portions of the frame that can be operated with a reduced subarray. Such information can help ensure acceptable decode and transmission of these portions of the frame.

Some implementations may additionally leverage a capability exchange with the remote endpoints (a transceiver, receiver, or transmitter that is part of the communication) or with logical controller functions that assist in coordinating this dynamic reduction in subarray size amongst the transmitters and receivers in the system. The endpoint is one of the two transceivers. Capability exchange—what kind of dynamic subarray selection is supported, subarray geometry, do you have two modes or sixteen modes, additional messages that might be used in the optimization that might be helpful to the process. Cannot assume that every body supports reduction or supports reduction in the same way.

When the reduction in the subarray size is employed during operations, such as CE, or other portions of the slot that enable the endpoints to adapt to factors like transmit power, receive gain, or related operations, embodiments can extrapolate the values measured at the one antenna or RFIC to a larger subarray or the full antenna array. For example, a determination that 6 dB of additional power amplifier gain during reception is required with a single subarray, may be reduced to 0 dB of additional power amplifier gain when 6 dB of additional array gain is achieved through use of the larger array during the reception of the frame payload. In another example, values determined from the CE field 520 can be assumed to apply to other RFICs in the array, such as to help determine a number of RFICs required to meet link budget requirements.

FIG. 6 illustrates, by way of example, a diagram of an embodiment of a phased array antenna system 600. The system 600 as illustrated includes an application 601, a modem 602, a transceiver 604, and an RF front end 606. The control circuitry 406 can be a part of the application 601, RF front end 606, the transceiver 604, or the modem 602. The components of the system 600 may be included in a user device, base station, gateway, mesh node, or the like.

The application 601 can monitor operation of one or more components of the system 600. The application 601 can provide data to be transmitted by the phased array antenna. The application 601 can receive data incident on the phased array antenna.

The modem 602 is sometimes referred to as the baseband. The modem 602 modulates and demodulates carrier wave signals, such as to encode data on a carrier wave or decode data on a carrier wave.

The transceiver 604 includes a receive radio and a transmit radio that share some circuitry. The RF front end 606 includes the circuitry between the transceiver and the antenna, such as can include one or more of the components of the array 400 but not the antenna 412A-412H.

In some embodiments, there may be signaling between the modem 602 or application 601 and the RF front-end 606, such as to trigger the utilization of a reduced array. In other embodiments, out-of-band signaling may be used to configure the subarray, so that time-sensitive transitions do not need to be driven by the modem 602 or the application 601. A time between communication of a control signal to reduce a size of an array and an actual reduction of the size of the array may be too late for the purpose. The portion of the frame that can benefit from the reduction in the array may complete before the array has time for the size reduction. Thus, an out-of-band signal, such as can be from a dedicated pin or other input, may be used to trigger the reduction in the array. As discussed, in some embodiments, this can be critical to ensure the precision of timing required within the timeframe of the transmission or reception of the frame. Without this timing precision, it is possible that the increased array gain will occur too soon or too late in the reception or transmission of a particular portion of the frame resulting in errors in the measurement or reduction in the probability for successful end-to-end transmission of portions of the frame.

FIG. 7 illustrates, by way of example, a diagram of an embodiment of a method 700 for reducing power usage of a phased antenna array. The method 700 can include providing by a controller of an antenna, a signal to a subarray of the antenna array that causes the subarray to be placed in an inactive state in response to a timer value of a timer corresponding to a first portion of a communication frame with a link budget requirement less than a specified threshold, at operation 702; and providing another signal to the subarray of the array that causes the subarray to be placed in an active state in response to the timer value corresponding to a second portion of the communication frame with a link budget requirement greater than a specified threshold, at operation 704. The method 700 can include, wherein the controller is part of a modem. The method 700 can include, wherein the system further comprises an application processor and the controller is part of the application processor.

The method 700 can include, wherein the communication frame is an Institute of Electrical and Electronic Engineers (IEEE) 802.11ad frame. The method 700 can include, wherein the first portion of the communication frame is a guard field, short training field, channel estimation field, or header field and the second portion of the communication frame is a data and training field. The method 700 can include estimating a link quality of the entire antenna array based on a link quality of one or more subarrays. The method 700 can further include, wherein the antenna array includes a plurality of radio frequency integrated circuits (RFICs), each of the RFICs including but not limited to antennas, amplifiers, mixers, and a phase shifters of a subarray of the array.

Figure 8A:
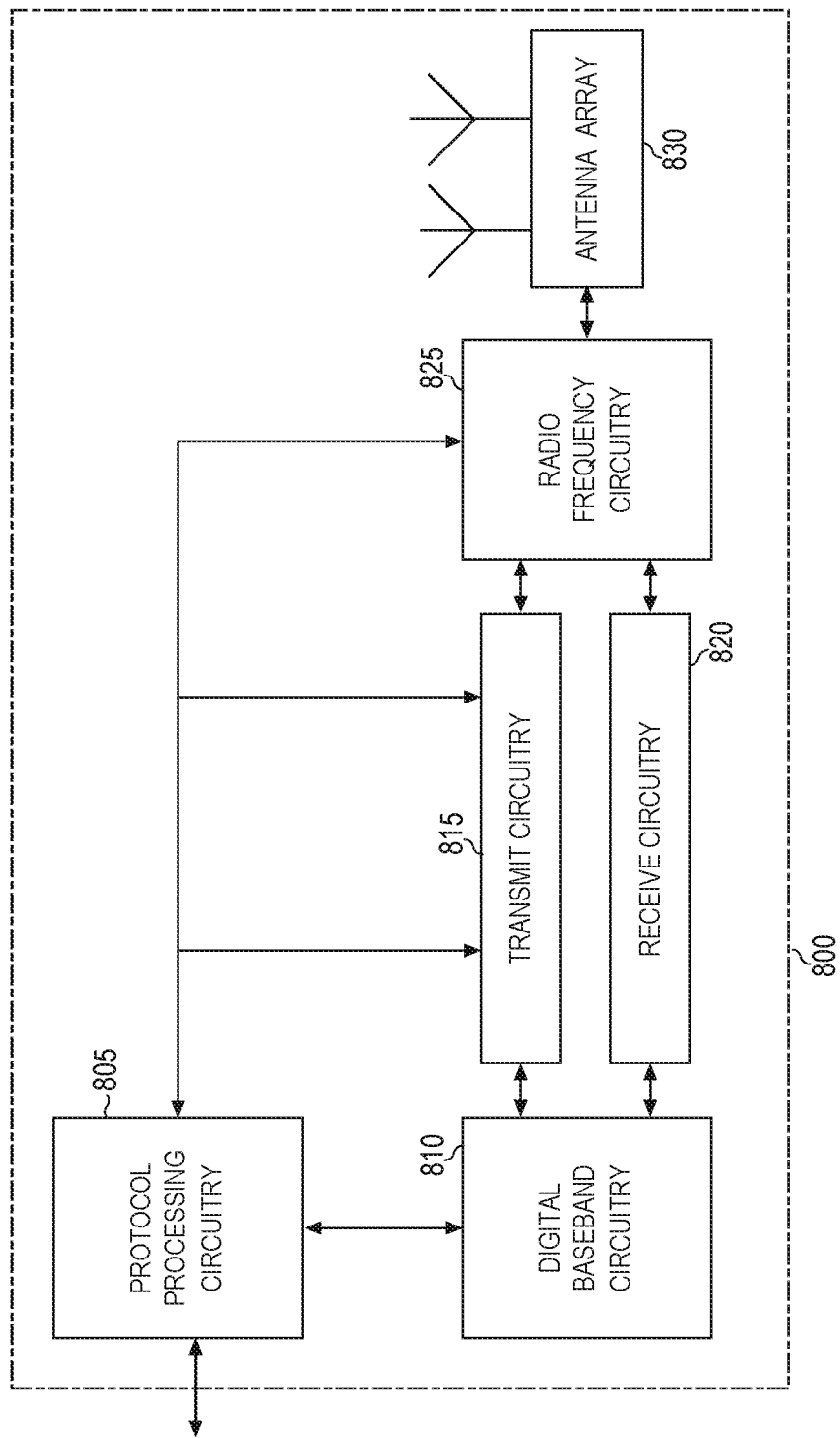
Figure 8E:
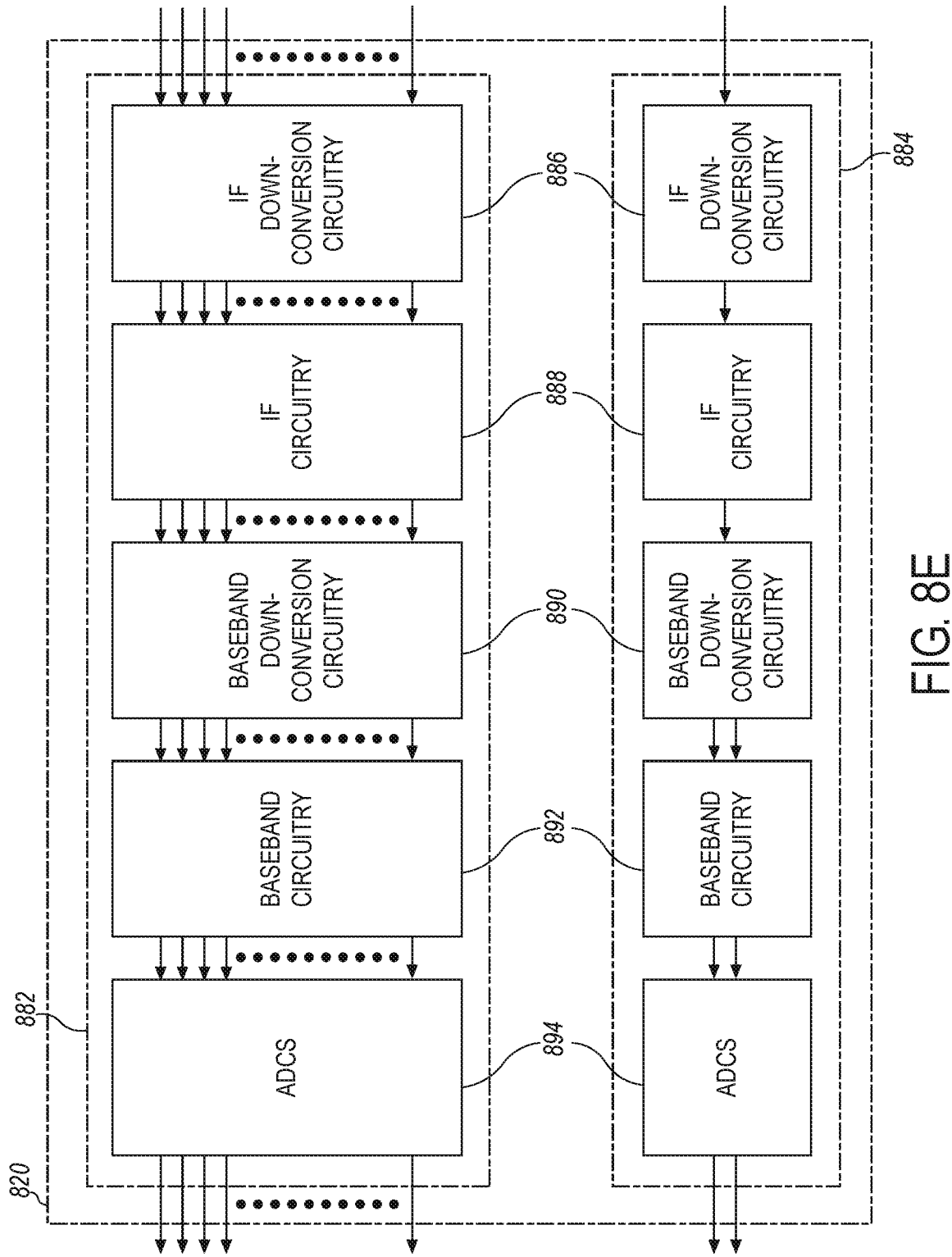

FIG. 8A illustrates, by way of example, a diagram of an embodiment of communication circuitry according to some aspects; FIGS. 8B and 8C illustrate aspects of transmit circuitry shown in FIG. 8A according to some aspects; FIG. 8D illustrates aspects of radio frequency circuitry shown in FIG. 8A according to some aspects; FIG. 8E illustrates aspects of receive circuitry in FIG. 8A according to some aspects. Millimeter wave communication circuitry 800 shown in FIG. 8A may be alternatively grouped according to functions. Components illustrated in FIG. 8A are provided here for illustrative purposes and may include other components not shown in FIG. 8A. The phased antenna array system 400 of FIG. 4 or phased antenna array system 600 of FIG. 6 may include one or more of the components of the FIGS. 8A-8E. One or more of the components of FIGS. 8A-8E may be powered off or put in a low power state, such as in response to determining that performance of the array will meet quality requirements without the component operating.

Communication circuitry 800 may include protocol processing circuitry 305 (or processor) or other means for processing. Protocol processing circuitry 805 may implement one or more of medium access control (MAC), radio link control (RLC), packet data convergence protocol (PDCP), radio resource control (RRC) and non-access stratum (NAS) functions, among others. Protocol processing circuitry 805 may include one or more processing cores to execute instructions and one or more memory structures to store program and data information.

Millimeter wave communication circuitry 800 may further include digital baseband circuitry 810. Digital baseband circuitry 810 may implement physical layer (PHY) functions including one or more of hybrid automatic rep eat request (HARQ) functions, scrambling and/or descrambling coding and/or decoding layer map ping and/or de-map ping modulation symbol map ping received symbol and/or bit metric determination, multi-antenna port pre-coding and/or decoding which may include one or more of space-time, space-frequency or spatial coding reference signal generation and/or detection, preamble sequence generation and/or decoding synchronization sequence generation and/or detection, control channel signal blind decoding and other related functions.

Millimeter wave communication circuitry 800 may further include transmit circuitry 815, receive circuitry 820 and/or antenna array circuitry 830. Millimeter wave communication circuitry 800 may further include RF circuitry 825. In some aspects, RF circuitry 825 may include one or multiple parallel RF chains for transmission and/or reception. Each of the RF chains may be connected to one or more antennas of antenna array circuitry 830.

In some aspects, protocol processing circuitry 805 may include one or more instances of control circuitry. The control circuitry may provide control functions for one or more of digital baseband circuitry 810, transmit circuitry 815, receive circuitry 820, and/or RF circuitry 825.

FIGS. 8B and 8C illustrate aspects of transmit circuitry shown in FIG. 8A according to some aspects. Transmit circuitry 815 shown in FIG. 8B may include one or more of digital to analog converters (DACs) 840, analog baseband circuitry 845, up-conversion circuitry 850 and/or filtering and amplification circuitry 855. DACs 840 may convert digital signals into analog signals. Analog baseband circuitry 845 may perform multiple functions as indicated below. Up-conversion circuitry 850 may up-convert baseband signals from analog baseband circuitry 845 to RF frequencies (e.g, mmWave frequencies). Filtering and amplification circuitry 855 may filter and amplify analog signals. Control signals may be supplied between protocol processing circuitry 805 and one or more of DACs 840, analog baseband circuitry 845, up-conversion circuitry 850 and/or filtering and amplification circuitry 855.

Transmit circuitry 815 shown in FIG. 8C may include digital transmit circuitry 865 and RF circuitry 870. In some aspects, signals from filtering and amplification circuitry 855 may be provided to digital transmit circuitry 865. As above, control signals may be supplied between protocol processing circuitry 805 and one or more of digital transmit circuitry 865 and RF circuitry 870.

FIG. 8D illustrates aspects of radio frequency circuitry shown in FIG. 8A according to some aspects. Radio frequency circuitry 825 may include one or more instances of radio chain circuitry 872, which in some aspects may include one or more filters, power amplifiers, low noise amplifiers, programmable phase shifters and power supplies.

Radio frequency circuitry 825 may also in some aspects include power combining and dividing circuitry 874. In some aspects, power combining and dividing circuitry 874 may operate bidirectionally, such that the same physical circuitry may be configured to operate as a power divider when the device is transmitting, and as a power combiner when the device is receiving. In some aspects, power combining and dividing circuitry 874 may include one or more wholly or partially separate circuitries to perform power dividing when the device is transmitting and power combining when the device is receiving. In some aspects, power combining and dividing circuitry 874 may include passive circuitry including one or more two-way power divider/combiners arranged in a tree. In some aspects, power combining and dividing circuitry 874 may include active circuitry including amplifier circuits.

In some aspects, radio frequency circuitry 825 may connect to transmit circuitry 815 and receive circuitry 820 in FIG. 8A. Radio frequency circuitry 825 may connect to transmit circuitry 815 and receive circuitry 820 via one or more radio chain interfaces 876 and/or a combined radio chain interface 878. In some aspects, one or more radio chain interfaces 876 may provide one or more interfaces to one or more receive or transmit signals, each associated with a single antenna structure. In some aspects, the combined radio chain interface 878 may provide a single interface to one or more receive or transmit signals, each associated with a group of antenna structures.

FIG. 8E illustrates aspects of receive circuitry in FIG. 8A according to some aspects. Receive circuitry 820 may include one or more of parallel receive circuitry 882 and/or one or more of combined receive circuitry 884. In some aspects, the one or more parallel receive circuitry 882 and one or more combined receive circuitry 884 may include one or more Intermediate Frequency (IF) down-conversion circuitry 886, IF processing circuitry 888, baseband down-conversion circuitry 890, baseband processing circuitry 892 and analog-to-digital converter (ADC) circuitry 894. As used herein, the term "intermediate frequency" refers to a frequency to which a carrier frequency (or a frequency signal) is shifted as in intermediate step in transmission, reception, and/or signal processing IF down-conversion circuitry 886 may convert received RF signals to IF. IF processing circuitry 888 may process the IF signals, e.g., via filtering and amplification. Baseband down-conversion circuitry 890 may convert the signals from IF processing circuitry 888 to baseband. Baseband processing circuitry 892 may process the baseband signals, e.g., via filtering and amplification. ADC circuitry 894 may convert the processed analog baseband signals to digital signals.

Figure 9:
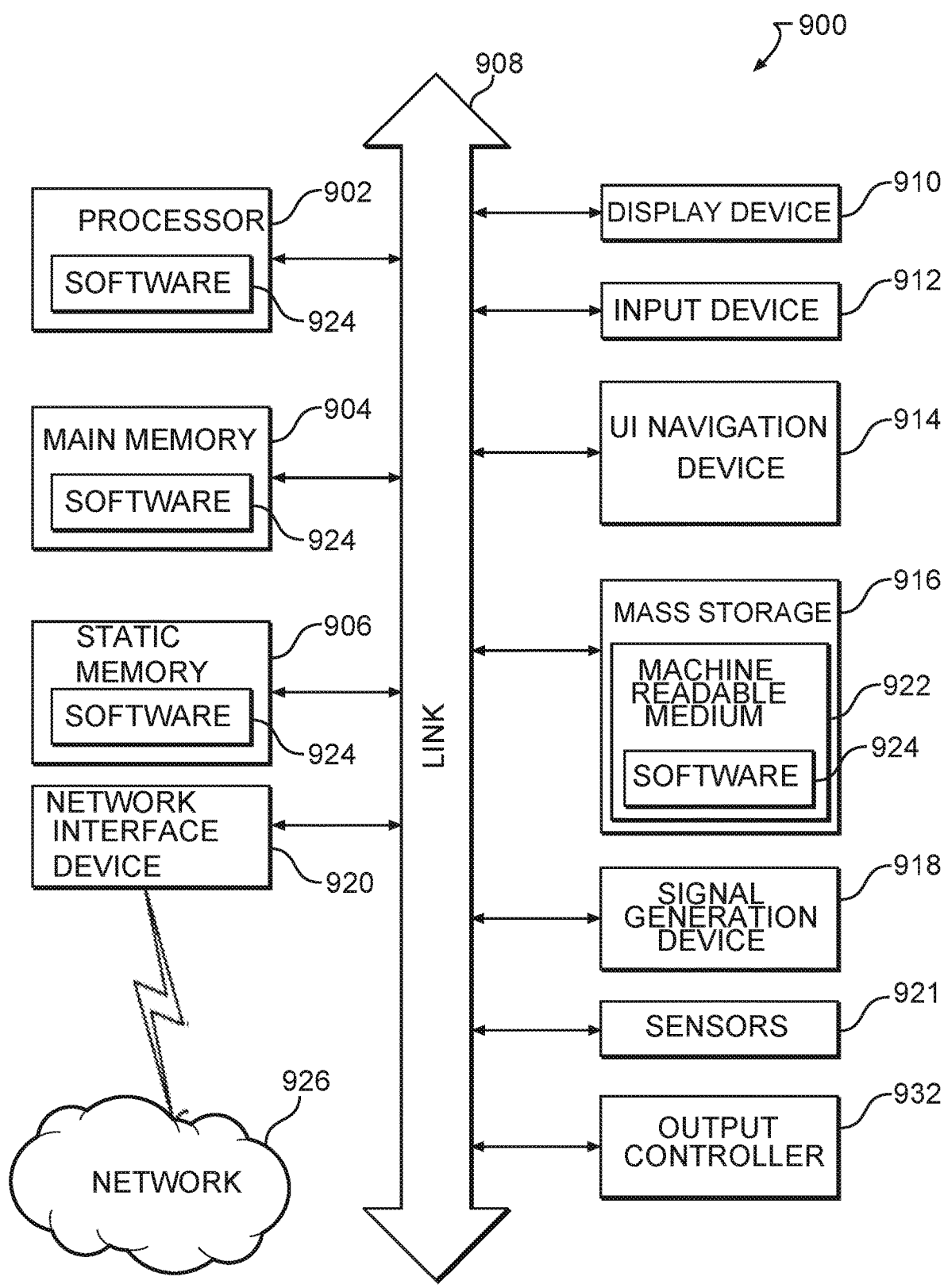
FIG. 9 is a block diagram illustrating a machine in the example form of a computer system, within which a set or sequence of instructions may be executed to cause the machine to perform any one of the methodologies discussed herein, according to an example embodiment.

FIG. 9 is a block diagram illustrating a machine in the example form of a computer system 900, within which a set or sequence of instructions may be executed to cause the machine to perform any one of the methodologies discussed herein, according to an example embodiment. For example, the method described above with reference to FIG. 3 or 7 may be performed using at least a portion of the computer system 900.

In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be an onboard vehicle system, an ADAS, an apparatus of an autonomous driving vehicle, a wearable device, a personal computer (PC), a tablet PC, a hybrid tablet, a personal digital assistant (PDA), a mobile telephone (e.g., a smartphone), or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein. For instance, a portion of the computer system 900 may execute instructions to perform the method described above with reference to FIGS. 3 and 7.

Example computer system 900 includes at least one processor 902 (e.g., a central processing unit (CPU), a graphics processing unit (GPU) or both, processor cores, compute nodes, etc.), a main memory 904 and a static memory 906, which communicate with each other via a link 908 (e.g., bus). The computer system 900 may further include a video display device 910, an input device 912 (e.g., an alphanumeric input device such as keyboard or keypad, a touchpad, a microphone, a camera, or components of a virtual reality/VR headset such as buttons), and a user interface (UI) navigation device 914 (e.g., a mouse, a stylus, or a pointing device). In one embodiment, the video display device 910, input device 912 and UI navigation device 914 are incorporated into a touch screen display (e.g., a touch sensitive display device).

The computer system 900 may additionally include a storage device 916 (e.g., a drive unit), a signal generation device 918 (e.g., a speaker), a network interface device 920, and one or more sensors 921, such as an RFID reader, a global positioning system (GPS) sensor, a camera, a compass, an accelerometer, a pyrometer, a magnetometer, or other sensors. The computer system 900 may also include an output controller 932, such as a serial (e.g., universal serial bus (USB), parallel, or other wired or wireless (e.g., IR, near field communication (NFC), etc.) connection to communicate or control one or more peripheral devices (e.g., a printer, card reader, etc.). In some embodiments, the processor 902 or instructions 924 (e.g., software in the example shown in FIG. 9) comprises processing circuitry or transceiver circuitry. The processing circuitry may include one or more electric or electronic components, such as one or more transistors, resistors, capacitors, inductors, diodes, regulators, analog to digital converters, digital to analog converters, logic gates (e.g., AND, OR, NAND, NOR, XOR, or other logic gates), multiplexers, modulators, switches, power supplies, or the like.

The storage device 916 includes a machine-readable medium 922 on which is stored one or more sets of data structures and instructions 924 (e.g., software) embodying or utilized by any one or more of the methodologies or functions described herein. For example, the computer system 900 may execute instructions 924 to perform the method described above with reference to FIGS. 3 and 7.

The instructions 924 may also reside, completely or at least partially, within the main memory 904, static memory 906, or within the processor 902 during execution thereof by the computer system 900, with the main memory 904, static memory 906, and the processor 902 also constituting machine-readable media 922.

While the machine-readable medium 922 is illustrated in an example embodiment to be a single medium, the term "machine-readable medium" may include a single medium or multiple media (e.g., a centralized or distributed database, or associated caches and servers) that store the one or more instructions 924. The term "machine-readable medium" shall also be taken to include any tangible medium that is capable of storing encoding or carrying instructions 924 for execution by the machine and that cause the machine to perform any one or more of the methodologies of the present disclosure or that is capable of storing encoding or carrying data structures utilized by or associated with such instructions 924. The term "machine-readable medium" shall accordingly be taken to include, but not be limited to, solid-state memories, and optical and magnetic media. Specific examples of machine-readable media 922 include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 924 may further be transmitted or received over a communications network 926 using a transmission medium via the network interface device 920 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Bluetooth, Wi-Fi, 3G, and 4G LTE/LTE-A or WiMAX networks). The network interface device 920 may transmit and receive data over a transmission medium, which may be wired or wireless (e.g., radio frequency, infrared or visible light spectra, etc.), fiber optics, or the like, to network 926.

Network interface device 920, according to various embodiments, may take any suitable form factor. In one such embodiment, network interface device 920 is in the form of a network interface card (NIC) that interfaces with processor 902 via link 908. In one example, link 908 includes a PCI Express (PCIe) bus, including a slot into which the NIC form-factor may removably engage. In another embodiment, network interface device 920 is a network interface circuit laid out on a motherboard together with local link circuitry, processor interface circuitry, other input/output circuitry, memory circuitry, storage device and peripheral controller circuitry, and the like. In another embodiment, network interface device 920 is a peripheral that interfaces with link 908 via a peripheral input/output port such as a universal serial bus (USB) port.

EXAMPLES

Example 1 is a device of a mesh distribution network, the device comp rising an application programming interface (API) to receive, from communicatively coup led mesh nodes of the mesh distribution network, data indicating whether respective mesh nodes of the mesh nodes are acting as gateways and an amount of traffic being served by the mesh nodes, and processing circuitry to determine, based on the received data, a first mesh node of the mesh nodes to put into an inactive state, and provide a communication to the first mesh node that causes the first mesh node to enter the inactive state.

In Example 2, Example 1 further includes, wherein determining based on the received data, the first mesh node of the mesh nodes to put into the inactive state includes determining whether the first mesh node is acting as a gateway and in response to determining the first mesh node is acting as a gateway, refraining from putting the first mesh node into the inactive state.

In Example 3, at least one of Examples 1-2 further includes, wherein the processing circuitry is further to provide a communication to a second mesh node of the mesh nodes that is communicatively coupled to the first mesh node, the communication indicating that the first mesh is going into the inactive state.

In Example 4, at least one of Examples 1-3 further includes, wherein the processing circuitry is further to compare the data indicating the amount of traffic being served by the first mesh node to a specified threshold, and determine the first mesh node is to be put into the inactive in response to determining the amount of traffic being served is less than the specified threshold.

In Example 5, at least one of Examples 1-4 further includes, wherein the API is further to receive further data indicating one or more of historical power consumption of the first mesh node, cost of power for the first mesh node, and a name of an entity responsible for providing power to the first mesh node.

In Example 6, at least one of Examples 1-5 further includes, wherein the API is further to receive further data indicating an operating temperature of the mesh nodes, and the processing circuitry is further to determine the first mesh node of the mesh nodes to put into an inactive state based on the operating temperature being greater than a specified threshold.

In Example 7, at least one of Examples 1-6 further includes, wherein the amount of traffic being served by the mesh nodes includes an amount of foreground traffic and background traffic and wherein the processing circuitry is further to provide a communication to a mesh node serving the background traffic that causes the background traffic to be routed around the mesh node.

In Example 8, at least one of Examples 1-7 further includes, wherein the API is further to receive data indicating a schedule of a location serviced by a mesh node of the mesh nodes, and the processing circuitry is further to, in response to determining the schedule indicates a time period of lower traffic is scheduled, providing the communication.

Example 9 includes a non-transitory machine-readable medium of a device of a mesh distribution network, the medium including instructions stored thereon that, when executed by the device, configure the device to perform operations for reducing power consumed in the mesh distribution network, the operations comprising receiving from communicatively coupled mesh nodes of the mesh distribution network, data indicating whether respective mesh nodes of the mesh nodes are acting as gateways and an amount of traffic being served by the mesh nodes, determining based on the received data, a first mesh node of the mesh nodes to put into an inactive state, and providing a communication to the first mesh node that causes the first mesh node to enter the inactive state.

In Example 10, Example 9 further includes, wherein determining based on the received data, the first mesh node of the mesh nodes to put into the inactive state includes determining whether the first mesh node is acting as a gateway and in response to determining the first mesh node is acting as a gateway, refraining from putting the first mesh node into the inactive state.

In Example 11, at least one of Examples 9-10 further includes, wherein the operations further comprise providing a communication to a second mesh node of the mesh nodes that is communicatively coupled to the first mesh node, the communication indicating that the first mesh is going into the inactive state.

In Example 12, at least one of Examples 9-11 further includes, wherein the operations further comprise comparing the data indicating the amount of traffic being served by the first mesh node to a specified threshold, and determine the first mesh node is to be put into the inactive in response to determining the amount of traffic being served is less than the specified threshold.

In Example 13, at least one of Examples 9-12 further includes, wherein the operations further comprise receiving further data indicating one or more of historical power consumption of the first mesh node, cost of power for the first mesh node, and a name of an entity responsible for providing power to the first mesh node.

In Example 14, at least one of Examples 9-13 further includes, wherein the operations further comprise receiving further data indicating an operating temperature of the mesh nodes, and determining the first mesh node of the mesh nodes to put into an inactive state based on the operating temperature being greater than a specified threshold.

In Example 15, at least one of Examples 9-14 further includes, wherein the amount of traffic being served by the mesh nodes includes an amount of foreground traffic and background traffic and wherein the operations further comprise providing a communication to a mesh node serving the background traffic that causes the background traffic to be routed around the mesh node.

In Example 16, at least one of Examples 9-15 further includes, wherein the operations further comprise receiving data indicating a schedule of a location serviced by a mesh node of the mesh nodes, and in response to determining the schedule indicates a time period of lower traffic is scheduled, providing the communication.

Example 17 includes a method performed by a device of a mesh distribution network and for reducing power consumed in the mesh distribution network, the method comprising receiving, from communicatively coupled mesh nodes of the mesh distribution network, data indicating whether respective mesh nodes of the mesh nodes are acting as gateways and an amount of traffic being served by the mesh nodes, determining based on the received data, a first mesh node of the mesh nodes to put into an inactive state, and providing a communication to the first mesh node that causes the first mesh node to enter the inactive state.

In Example 18, Example 17 further includes, wherein determining based on the received data, the first mesh node of the mesh nodes to put into the inactive state includes determining whether the first mesh node is acting as a gateway and in response to determining the first mesh node is acting as a gateway, refraining from putting the first mesh node into the inactive state.

In Example 19, at least one of Examples 17-18 further includes providing a communication to a second mesh node of the mesh nodes that is communicatively coupled to the first mesh node, the communication indicating that the first mesh is going into the inactive state.

In Example 20, at least one of Examples 17-19 further includes comparing the data indicating the amount of traffic being served by the first mesh node to a specified threshold, and determining the first mesh node is to be put into the inactive in response to determining the amount of traffic being served is less than the specified threshold.

In Example 21, at least one of Examples 17-20 further includes receiving further data indicating one or more of historical power consumption of the first mesh node, cost of power for the first mesh node, and a name of an entity responsible for providing power to the first mesh node.

In Example 22, at least one of Examples 17-21 further includes receiving further data indicating an operating temperature of the mesh nodes, and determining the first mesh node of the mesh nodes to put into an inactive state based on the operating temperature being greater than a specified threshold.

In Example 23, at least one of Examples 17-22 further includes, wherein the amount of traffic being served by the mesh nodes includes an amount of foreground traffic and background traffic and the method further comprises providing a communication to a mesh node serving the background traffic that causes the background traffic to be routed around the mesh node.

In Example 24, at least one of Examples 17-23 further includes receiving data indicating a schedule of a location serviced by a mesh node of the mesh nodes, and in response to determining the schedule indicates a time period of lower traffic is scheduled, providing the communication.

Example 25 includes a phased array antenna system comprising antennas configured in an array, a timer to provide a timer value, a controller coupled to the timer and the array, the controller to provide a signal to a subarray of the array that causes the subarray to be placed in an inactive state in response to the timer value corresponding to a first portion of a communication frame with a link budget requirement less than a specified threshold, and provide another signal to the subarray of the array that causes the subarray to be placed in an active state in response to the timer value corresponding to a second portion of the communication frame with a link budget requirement greater than a specified threshold.

In Example 26, Example 25 further includes, wherein the system further comprises a modem and the controller is part of the modem.

In Example 27, at least one of Examples 25-26 further includes, wherein the system further comprises an application processor and the controller is part of the application processor.

In Example 28, at least one of Examples 25-27 further includes, wherein the communication frame is an Institute of Electrical and Electronic Engineers (IEEE) 802.11ad frame.

In Examples 29, Example 28 further includes, wherein the first portion of the communication frame is a guard field, short training field, channel estimation field, or header field and the second portion of the communication frame is a data and training field.

In Example 30, at least one of Examples 25-29 further includes, wherein the system includes circuitry to estimate a link quality of the entire antenna array based on a link quality of one or more subarray s.

In Example 31, at least one of Examples 25-30 further includes, wherein the antenna array includes a plurality of radio frequency integrated circuits (RFICs), each of the RFICs including an antenna, amplifier, mixer, and a phase shifter of a subarray of the array.

Example 32 includes a method of reducing power consumed by a phased array antenna system, the method comprising providing, by a controller of an antenna, a signal to a subarray of the antenna array that causes the subarray to be placed in an inactive state in response to a timer value of a timer corresponding to a first portion of a communication frame with a link budget requirement less than a specified threshold, and providing another signal to the subarray of the array that causes the subarray to be placed in an active state in response to the timer value corresponding to a second portion of the communication frame with a link budget requirement greater than a specified threshold.

In Example 33, Example 32 further includes, wherein the controller is part of a modem.

In Example 34, at least one of Examples 32-33 further includes, wherein the system further comprises an application processor and the controller is part of the application processor.

In Example 35, at least one of Examples 32-34 further includes, wherein the communication frame is an Institute of Electrical and Electronic Engineers (IEEE) 802.11ad frame.

In Example 36, Example 35 further includes, wherein the first portion of the communication frame is a guard field, short training field, channel estimation field, or header field and the second portion of the communication frame is a data and training field.

In Example 37, at least one of Examples 32-36 further includes estimating a link quality of the entire antenna array based on a link quality of one or more subarrays.

In Example 38, at least one of Examples 32-37 further includes, wherein the antenna array includes a plurality of radio frequency integrated circuits (RFICs), each of the RFICs including an antenna, amplifier, mixer, and a phase shifter of a subarray of the array.

Example 39 includes a non-transitory machine-readable medium of a controller of a phased antenna array system, the medium including instructions stored thereon that, when executed by the device, configure the device to perform operations for reducing power consumed by the phased array antenna system, the operations comprising operations of at least one of Examples 32-38.

Additional Notes

The above detailed description includes references to the accompanying drawings, which faun a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A device of a mesh distribution network, the device comprising:

a non-transitory memory medium including instructions stored thereon that, when executed by the device, configure the device to receive, from communicatively coupled mesh nodes of the mesh distribution network, data indicating which respective mesh nodes of the mesh nodes are currently active gateways ingressing or egressing traffic from the mesh distribution network and at least one user device versus other mesh nodes of the mesh nodes that are not currently ingressing or egressing traffic from the mesh distribution network, and an amount of traffic being served by the other mesh nodes; and processing circuitry configured to:
determine, based on the received data, a first mesh node of the other mesh nodes to put into an inactive state; and
provide a communication to the first mesh node that causes the first mesh node to enter the inactive state.

2. The device of claim 1,
wherein the processing circuitry is further configured to:
refrain from putting into the inactive state the mesh nodes that are currently active gateways ingressing or egressing traffic from the mesh distribution network.

3. The device of claim 1,
wherein the processing circuitry is further configured to provide a communication to a second mesh node of the mesh nodes that is communicatively coupled to the first mesh node, the communication indicating that the first mesh node is going into the inactive state.

4. The device of claim 1,
wherein the processing circuitry is further configured to:
compare the data indicating the amount of traffic being served by the first mesh node to a specified threshold; and
determine the first mesh node is to be put into the inactive state in response to determining the amount of traffic being served is less than the specified threshold.

5. The device of claim 1,
wherein the memory medium includes further instructions that, when executed by the device, configure the device to receive further data indicating one or more of historical power consumption of the first mesh node, cost of power for the first mesh node, and a name of an entity responsible for providing power to the first mesh node.

6. The device of claim 1,
wherein the memory medium includes further instructions that, when executed by the device, configure the device to receive further data indicating an operating temperature of the mesh nodes; and
wherein the processing circuitry is further configured to determine the first mesh node of the other mesh nodes to put into an inactive state based on the operating temperature being greater than a specified threshold.

7. The device of claim 1,
wherein the amount of traffic being served by the other mesh nodes includes an amount of foreground traffic and background traffic, and wherein the processing circuitry is further configured to provide a communication to a mesh node serving the background traffic, wherein providing the communication to the mesh node causes the background traffic to be routed around the mesh node.

8. The device of claim 1,
wherein the memory medium includes further instructions that, when executed by the device, configure the device to receive data indicating a schedule of a location serviced by a mesh node of the mesh nodes; and
wherein the processing circuitry is further configured to provide the communication in response to determining that the schedule indicates a time period of lower traffic is scheduled.

9. A non-transitory machine-readable memory medium of a device of a mesh distribution network, the memory medium including instructions stored thereon that, when executed by the device, configure the device to perform operations for reducing power consumed in the mesh distribution network, the operations comprising:

receiving from communicatively coupled mesh nodes of the mesh distribution network, data indicating which respective mesh nodes of the mesh nodes are currently active gateways ingressing or egressing traffic from the mesh distribution network and at least one user device versus other mesh nodes of the mesh nodes that are not currently ingressing or egressing traffic from the mesh distribution network, and an amount of traffic being served by the other mesh nodes;

determining based on the received data, a first mesh node of the other mesh nodes to put into an inactive state; and providing a communication to the first mesh node that causes the first mesh node to enter the inactive state.

10. The non-transitory of machine-readable memory medium of claim 9, wherein the operations further comprise:
refraining from putting into the inactive state the mesh nodes that are currently active gateways ingressing or egressing traffic from the mesh distribution network.

11. The non-transitory of machine-readable memory of claim 9,
wherein the operations further comprise providing a communication to a second mesh node of the mesh nodes that is communicatively coupled to the first mesh node, the communication indicating that the first mesh node is going into the inactive state.

12. The non-transitory of machine-readable memory of claim 9,
wherein the operations further comprise comparing the data indicating the amount of traffic being served by the first mesh node to a specified threshold, and determine the first mesh node is to be put into the inactive state in response to determining the amount of traffic being served is less than the specified threshold.

13. The non-transitory of machine-readable memory medium of claim 9,
wherein the operations further comprise receiving further data indicating one or more of historical power consumption of the first mesh node, cost of power for the first mesh node, and a name of an entity responsible for providing power to the first mesh node.

14. The non-transitory of machine-readable memory medium of claim 9,
wherein the operations further comprise:
receiving further data indicating an operating temperature of the mesh nodes; and determining the first mesh node of the other mesh nodes to put into an inactive state based on the operating temperature being greater than a specified threshold.

15. The non-transitory of machine-readable memory medium of claim 9,
wherein the amount of traffic being served by the other mesh nodes includes an amount of foreground traffic and background traffic, and wherein the operations further comprise providing a communication to a mesh node serving the background traffic, wherein providing the communication to the mesh node causes the background traffic to be routed around the mesh node.

16. The non-transitory of machine-readable memory medium of claim 9,
wherein the operations further comprise receiving data indicating a schedule of a location serviced by a mesh node of the mesh nodes, and providing the communication in response to determining that the schedule indicates a time period of lower traffic is scheduled.

17. A method performed by a device of a mesh distribution network and for reducing power consumed in the mesh distribution network, the method comprising:
receiving from communicatively coupled mesh nodes of the mesh distribution network, data indicating which respective mesh nodes of the mesh nodes are currently active gateways ingressing or egressing traffic from the mesh distribution network and at least one user device versus other mesh nodes of the mesh nodes that are not currently ingressing or egressing traffic from the mesh distribution network, and an amount of traffic being served by the other mesh nodes;
determining based on the received data, a first mesh node of the other mesh nodes to put into an inactive state; and
providing a communication to the first mesh node that causes the first mesh node to enter the inactive state.

18. The method of claim 17, further comprising:
refraining from putting into the inactive state the mesh nodes that are currently active gateways ingressing or egressing traffic from the mesh distribution network.

19. The method of claim 17, further comprising:
providing a communication to a second mesh node of the mesh nodes that is communicatively coupled to the first mesh node, the communication indicating that the first mesh node is going into the inactive state.

20. The method of claim 17, further comprising:
comparing the data indicating the amount of traffic being served by the first mesh node to a specified threshold; and
determining the first mesh node is to be put into the inactive state in response to determining the amount of traffic being served is less than the specified threshold.

* * * * *